(12) United States Patent
Kuo

(10) Patent No.: US 8,950,943 B2
(45) Date of Patent: Feb. 10, 2015

(54) ROLLER BEARING

(71) Applicant: Hiwin Technology Corp., Taichung City (TW)

(72) Inventor: Chang-Hsin Kuo, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 68 days.

(21) Appl. No.: 13/886,118

(22) Filed: May 2, 2013

(65) Prior Publication Data

US 2014/0328555 A1 Nov. 6, 2014

(51) Int. Cl.
*F16C 19/50* (2006.01)
*F16C 33/58* (2006.01)

(52) U.S. Cl.
CPC ..................................... *F16C 33/585* (2013.01)
USPC ........................................... 384/447; 384/622

(58) Field of Classification Search
CPC ...... F16C 19/36; F16C 19/361; F16C 33/583; F16C 33/585; F16C 33/60
USPC .................. 384/447, 619, 620, 622
See application file for complete search history.

(56) References Cited

U.S. PATENT DOCUMENTS

| | | | | |
|---|---|---|---|---|
| 4,961,653 A * | 10/1990 | Suzuki et al. | .................. | 384/447 |
| 5,026,177 A * | 6/1991 | Masuda | ........................ | 384/447 |
| 5,033,873 A * | 7/1991 | Suzuki | .......................... | 384/447 |
| 5,441,350 A * | 8/1995 | Fujita | ............................ | 384/447 |
| 6,547,441 B2 * | 4/2003 | Kato | ............................. | 384/447 |

\* cited by examiner

*Primary Examiner* — Phillip A Johnson
(74) *Attorney, Agent, or Firm* — Muncy, Geissler, Olds & Lowe, P.C.

(57) ABSTRACT

A roller bearing, includes an outer race and an inner race coupled together and rotatable relative to each other, the inner and outer race each defining therein a respective rolling channel, each rolling channel defining two raceway faces abutted at right angles, and rollers accommodated in the rolling channels of the inner and outer races and rotatably kept in contact with the raceway faces of the inner and outer races. The roller bearing is characterized in that the inner and outer races each define a groove between the respective two raceway faces thereof; the ratio between the width of each raceway face and the diameter of each roller is $\geq 0.45$ and $\leq 0.62$, thus, the friction resistance between the rollers and the raceway faces is minimized, and therefore, the roller bearing does not wear easily when rotated at a high speed.

7 Claims, 5 Drawing Sheets

ROLLER BEARING

BACKGROUND OF THE INVENTION

1. Field of the Invention

The present invention relates to bearing technology and more particularly, to a roller bearing, which has low sliding friction.

2. Description of the Related Art

Referring to FIG. 1, a conventional roller bearing 10 is known comprising an inner race 11, an outer race 12, and a plurality of rollers 13 rotatably accommodated between the inner race 11 and the outer race 12. The inner race 11 and the outer race 12 each define therein two raceway faces 112;122 abutted at right angles. Each roller 13 has the cylindrical surface 132 thereof rotatably kept in contact with one raceway face 112 of the inner race 11 and one raceway face 122 of the outer race 12, allowing the inner race 11 and the outer race 12 to be fastened together and rotatable relative to each other. Because rolling contact causes less friction resistance, the inner race 11 and the outer race 12 can be smoothly rotated relative to each other, and a less amount of torque is required to rotate the inner race 11 and the outer race 12.

Among the commercial roller bearings, the length of the rollers 13 is approximately equal to the outer diameter of the rollers 13, and also approximately equal to the width of the raceway faces 112;122. Thus, the cylindrical surface 132 of each roller 13 is almost fully kept in contact with the raceway faces 112;122. Because the tangential velocity at different portions of the raceway faces is different, sliding between the rollers 13 and the raceway faces 112;122 causes a rise in friction resistance.

In other words, the large contact length between the rollers and raceway faces of the conventional roller bearings leads to a large friction resistance. If these roller bearings are used in a high speed device, they can be damaged easily due to a rapid rise in temperature. Therefore, improvement in this regard is desired.

SUMMARY OF THE INVENTION

The present invention has been accomplished under the circumstances in view. It is the main object of the present invention to provide a roller bearing, which minimizes friction resistance between rollers and raceway faces and does not wear easily when rotated at a high speed.

To achieve this and other objects of the present invention, a roller bearing comprises an outer race and an inner race coupled together and rotatable relative to each other, and a plurality of rollers accommodated in between the outer race and the inner race. The outer race and the inner race each define therein a respective rolling channel. The rolling channel defines two raceway faces abutted at right angles. The rollers are accommodated in the rolling channel of the outer race and the rolling channel of the inner race and rotatably kept in contact with the raceway faces of the outer race and the raceway faces of the inner race.

The roller bearing is characterized in that the rolling channel of the outer race and the rolling channel of the inner race each define therein a groove. The groove of the outer ace is located between the raceway faces of the outer race and curved inward from the two raceway faces of the outer ace. The groove of the inner race is located between the raceway faces of the inner race and curved inward from the two raceway faces of the inner race. The ratio between the width of each raceway face and the diameter of each roller is ≥0.45 and ≤0.62.

Thus, compared to the prior art roller bearing, the invention can cause less sliding friction but reduces its load capacity, due to shortened contact length between each roller 50 and the raceway faces 361;362 and 461;462, the roller bearing 20. It is a useful design for light loading in high speed circumstance.

Subject to the designed value of the ratio between the width of each raceway face and the diameter, the roller bearing of the present invention effectively reduces the sliding fiction between the rollers and the raceway faces slightly reduced the load capacity of the roller bearing. Thus, when compared to the prior art design, the roller bearing of the present invention does not wear easily during rotation at a high speed.

Other advantages and features of the present invention will be fully understood by reference to the following specification in conjunction with the accompanying drawings, in which like reference signs denote like components of structure.

DETAILED DESCRIPTION OF THE INVENTION

Figure 1:
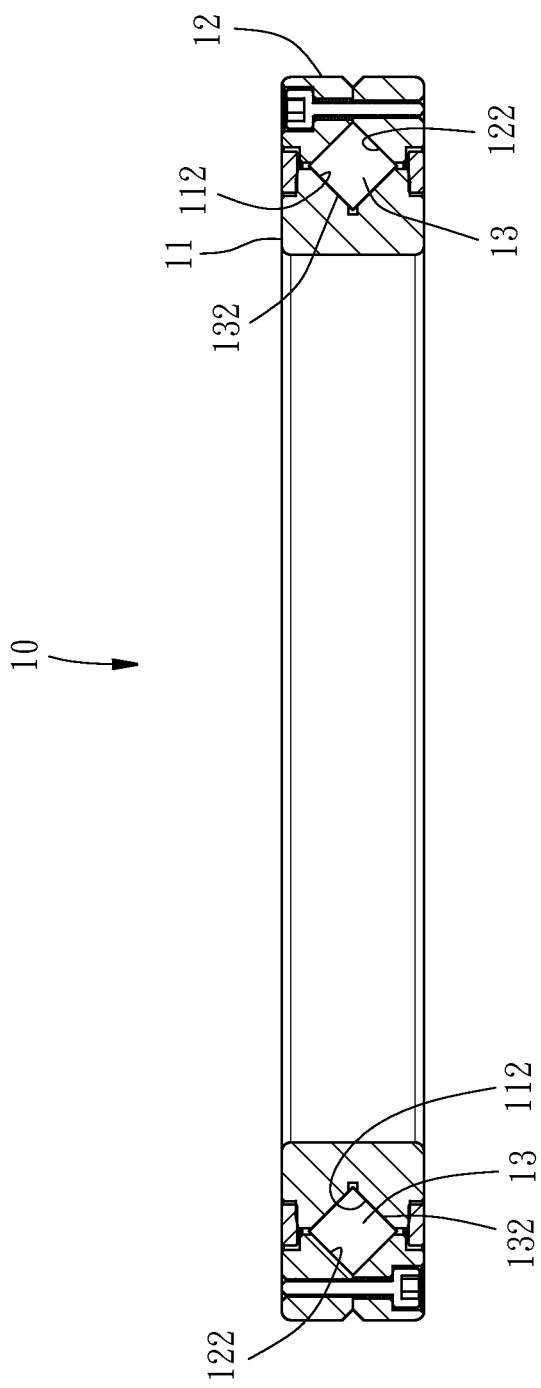
FIG. 1 is a schematic sectional view of a roller bearing according to the prior art.
Figure 2:
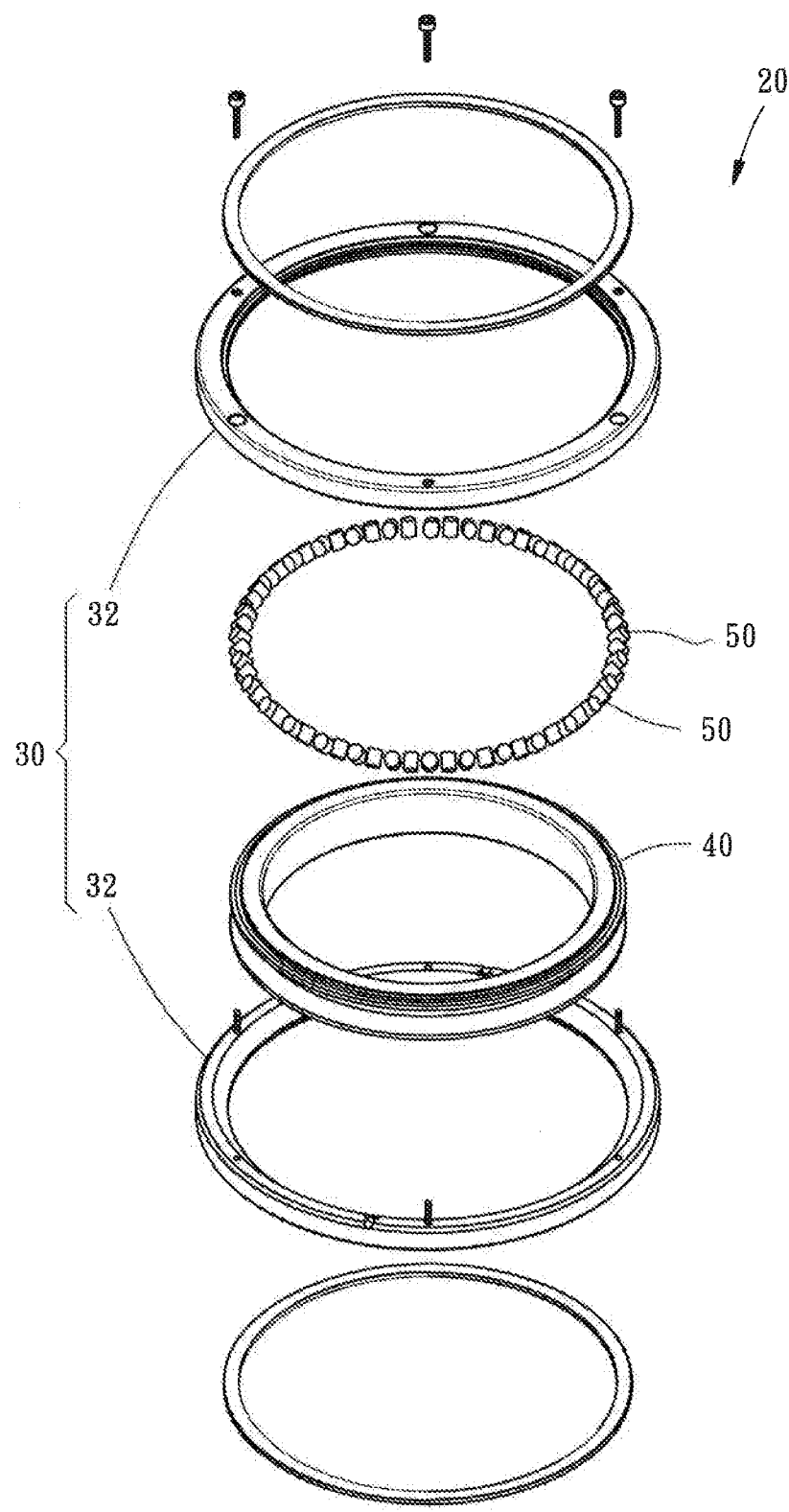
FIG. 2 is an exploded view of a roller bearing in accordance with a first embodiment of the present invention.
Figure 3:
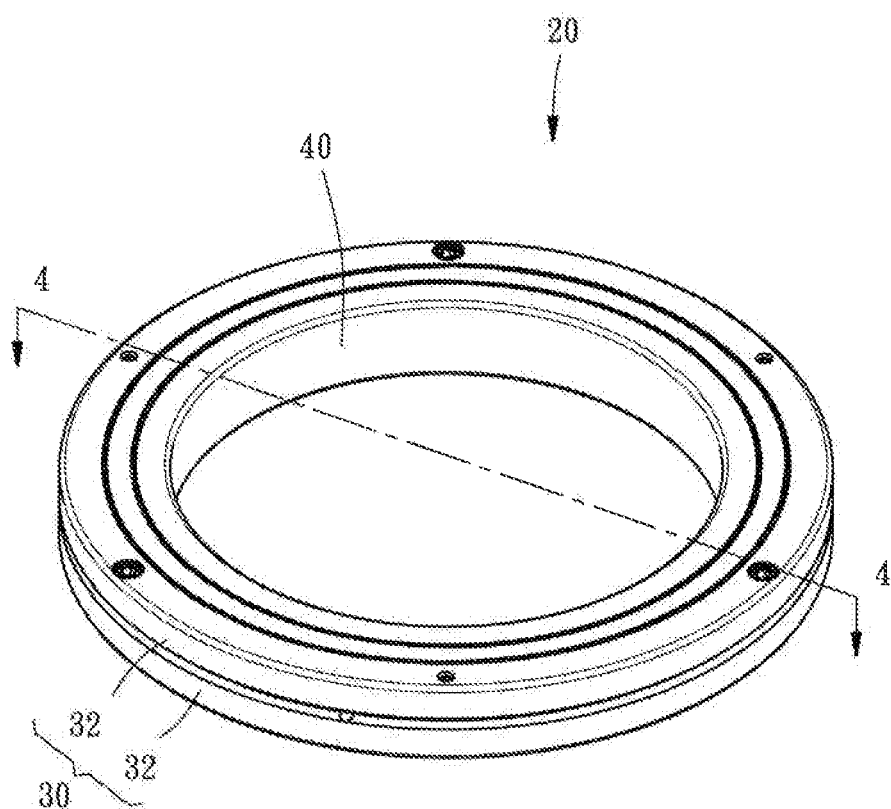
FIG. 3 is an elevational assembly view of the roller bearing in accordance with the first embodiment of the present invention.

Referring to FIGS. 2 and 3, a roller bearing 20 in accordance with a first embodiment of the present invention is shown. As illustrated, the roller bearing 20 comprises an outer race 30, an inner race 40, and a plurality of rollers 50.

Figure 4:
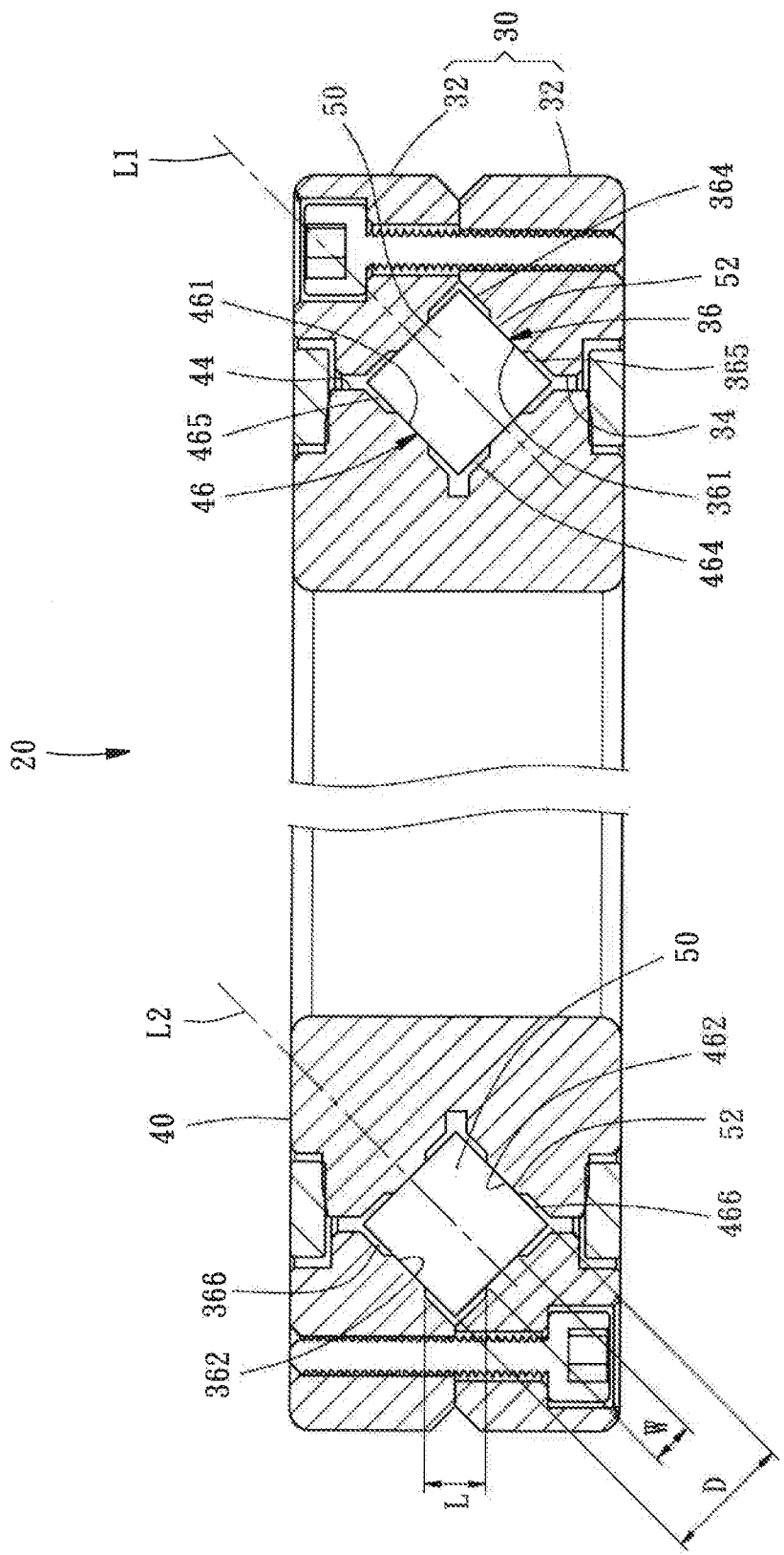
FIG. 4 is a sectional view taken along line 4-4 of FIG. 3.

In this embodiment, the outer race 30 is formed of two ring-shaped halves 32 that are fixedly fastened together. As shown in FIG. 4, the outer race 30 comprises an inner surface 34, and a rolling channel 36 curved inward in the inner surface 34. The rolling channel 36 has a V-shaped cross section, defining two raceway faces 361 and 362 that are abutted at right angles, a groove 364 located in between the two raceway faces 361 and 362 and curved inward from the two raceway faces 361 and 362, and two notches 365 and 366 respectively located between the two raceway faces 361 and 362 and the inner surface 34.

The inner race 40 comprises an outer surface 44, and a rolling channel 46 curved inward in the outer surface 44. The rolling channel 46 defines two raceway faces 461 and 462 that are abutted at right angles, a groove 464 located in between the two raceway faces 461 and 462 and curved inward from the raceway faces 461 and 462, and two notches 465 and 466 respectively located between the two raceway faces 461 and 462 and the outer surface 44.

The inner race 40 is mounted in the center of the outer race 30, keeping its outer surface 44 to face toward the inner surface 34 of the outer race 30. The rollers 50 are mounted in the rolling channel 36 of the outer race 30 and the rolling channel 46 of the inner race 40 and rotatably kept in contact with the raceway faces 361 and 362 of the outer race 30 and the raceway faces 461 and 462 of the inner race 40, enabling the outer race 30 and the inner race 40 to be coupled together and rotatable relative to each other.

As shown in FIG. 2, each two adjacent rollers 50 are arranged crossing over each other, thus, one half of the rollers 50 (see that indicated in the right side in FIG. 4) have their cylindrical surfaces 52 rotatably kept in contact with the raceway face 361 of the outer race 30 and the raceway face 461 of the inner race 40, and the other half of the rollers 50 ((see that indicated in the left side in FIG. 4) have their cylindrical surfaces 52 rotatably kept in contact with the raceway face 362 of the outer race 30 and the raceway face 462 of the inner race 40.

The length of each roller 50 is approximately equal to its diameter D. The distance between the two raceway faces 361 and 461 and the distance between the two raceway faces 362 and 462 are also approximately equal to the diameter D of each roller 50. Because grooves 364 and 464 and notches 365;366 and 465;466 are defined in the rolling channels 36 and 46, each roller 50 simply has a part of its cylindrical surface 52 rotatably kept in contact with the raceway faces 361;362 and 461;462. Thus, when compared to the prior art roller bearing, the invention can cause less sliding friction. Further, due to shortened contact length between each roller 50 and the raceway faces 361;362 and 461;462, the roller bearing 20 reduces its load capacity.

As the slip torque is directly proportional to the square of aforesaid contact length and the load capacity is directly proportional to the aforesaid contact length, assume the diameter D is 1 and, the aforesaid contact length is x, the optimal value of the contact length x can be calculated subject to the following two equations:

$$y = x^2, 0 \leq x \leq 1$$

$$y = 1-x, 0 \leq x \leq 1$$

The calculation result of the aforesaid two equations: x=0.62, i.e., when the contact length between the rollers 50 and the raceway faces 361;362 and 461;462 is reduced to 0.62 of the diameter D of the rollers 50, the sliding friction is significantly reduced without significantly reduces the load capacity of the roller bearing 20. Thus, the width of the raceway faces 361;362 and 461;462 (the width of the raceway faces 361;362 is the shortest distance between the notches 365;366 and the groove 364; the width of the raceway faces 461;462 is the shortest distance between the notches 465;466 and the groove 464) can be designed to be 0.62D.

The foregoing analysis simply took sliding theoretical volume into consideration. In actual application, other factors, such as vibration, oil damping, and etc. should be taken into consideration. With respect to the relationship between the ratio between raceway face width W (in FIG. 4, the raceway face width W indicates the width of the raceway face 361, however, in the specification, the raceway face width W can be the width of each raceway face 361;362;461;462) and roller diameter D and the temperature rise during operation of the roller bearing. According to actual test results, when W/D is smaller than 0.45, reduction of the value of W is less significant to reduction of the temperature rise. Therefore, the invention designs the value of the ratio between the width W of each raceway face 361;362;461;462 and the diameter D of each roller 50 to be ≥0.45 and ≤0.62, thereby effectively reducing sliding friction. Thus, when compared to the prior art design, the roller bearing 20 of the present invention does not wear easily during rotation at a high speed.

In this embodiment, the raceway faces 361;362;461;462 have the same width W; the two raceway faces 361 and 461 are symmetrical relative to the central axis L1 of the associating rolling-contacted roller 50; the two raceway faces 362 and 462 are symmetrical relative to the central axis L2 of the associating rolling-contacted roller 50. Thus, the contact areas of each roller 50 relative to the outer race 30 and the inner race 40 are symmetrical, avoiding the problem of reduction of the load capacity of the rollers 50 due to uneven pressure and the problem of torque generation to cause damage to the rollers 50. However, it is to be noted that the widths of the raceway faces 361;362;461;462 are not limited to the condition of equality or symmetrical relationship, however, they must meet the aforesaid ratio.

Further, in this embodiment, the raceway faces 361;362; 461;462 are respectively disposed facing toward the center area of the cylindrical surfaces 52 of the rollers 50. Under this condition, the opening width 14 of each groove 364;464 satisfies the following equation:

$$L = (D-W)/1.414$$

Thus, every roller 50 can bear pressure evenly, enhancing its load capacity and avoiding damage. However, the condition where the opening width L of each groove 364;464 satisfies the above equation is not a limitation.

Figure 5:
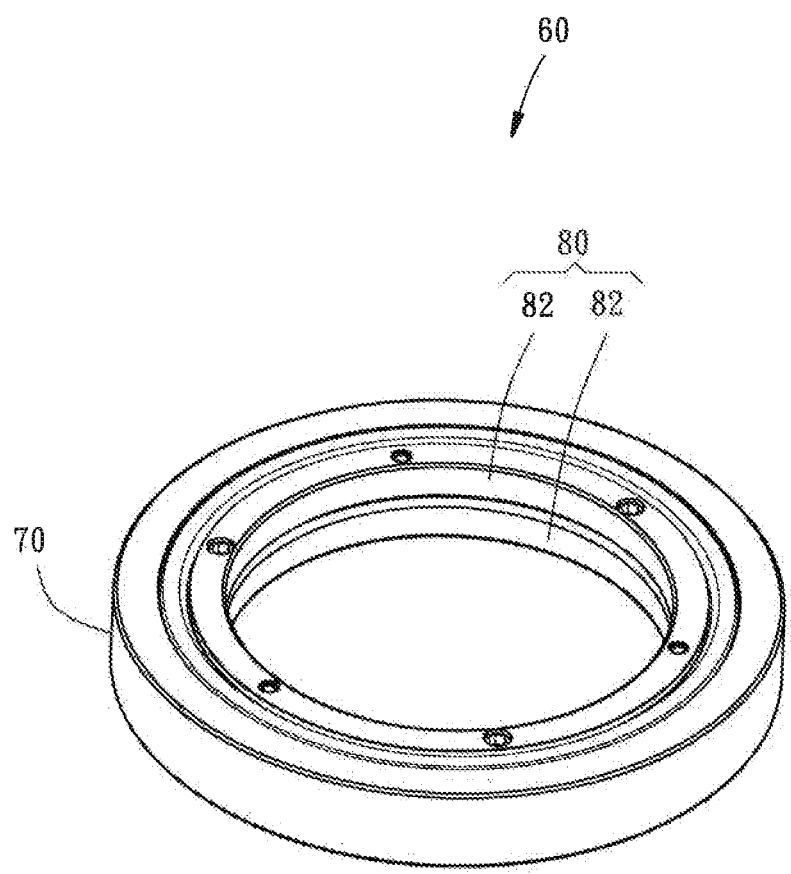
FIG. 5 is an elevational assembly view of a roller bearing in accordance with a second embodiment of the present invention.

It is worth mentioning that the inner race 40 of the roller bearing 20 configured subject to the aforesaid first embodiment is a single piece member, and the outer race 30 is formed of two ring-shaped halves 32. This design facilitates installation of the rollers 50 in between the inner race 40 and the outer race 30. However, the aforesaid features for enabling the roller bearing 20 to reduce its friction resistance and to maintain its load capacity can also be employed to a roller bearing 60 shown in FIG. 5 that is configured in accordance with a second embodiment of the present invention. According to this second embodiment, the outer race 70 is a single piece member, and the inner race 80 is formed of two ring-shaped halves 82 that are fixedly fastened together. This alternate form also facilitates installation of the rollers. In another alternate form of the roller bearing in accordance with the present invention, the inner race and the outer race are single piece members.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A roller bearing, comprising an outer race, an inner race and a plurality of rollers, said outer race and said inner race each defining a respective rolling channel, each said rolling channel comprising two raceway faces abutted at right angles, said rollers being accommodated in the rolling channel of said outer race and the rolling channel of said inner race and rotatably kept in contact with the raceway face of said outer race and the raceway face of said inner race, said outer race and said inner race being fastened together and rotatable relative to each other, which is characterized in that:

the rolling channel of said outer race and the rolling channel of said inner race define therein a respective groove, the groove of said outer race being disposed between and curved inward from the two raceway faces of said outer race, the ratio between the width of each said raceway face and the diameter of each said roller is ≥0.45 and ≤0.62.

2. The roller bearing as claimed in claim 1, wherein the opening width of each said groove satisfies the equation of:

$$L = (D-W)/1.414,$$

In which L is the opening width of each said groove, D is the diameter of each said roller, W is the width of each said raceway face.

3. The roller bearing as claimed in claim 1, wherein said outer race comprises an inner surface facing toward said inner race; the rolling channel of said outer race comprises two notches respectively disposed between the two raceway faces of said outer race and said inner surface; the widths of the two raceway faces of said outer race are the respective shortest distances between the two notches of said outer race and the groove of said outer race.

4. The roller bearing as claimed in claim 1, wherein said inner race comprises an outer surface facing toward said outer race; the rolling channel of said inner race comprises two notches respectively disposed between the two raceway faces of said inner race and said outer surface; the widths of the two raceway faces of said inner race are the respective shortest distances between the two notches of said inner race and the groove of said inner race.

5. The roller bearing as claimed in claim 1, wherein one raceway face of said outer race and one raceway face of said inner race are symmetrical relative to the central axis of the associated rolling contacting roller; the other raceway face of said outer race and the other raceway face of said inner race are symmetrical relative to the central axis of the associating rolling-contacted roller.

6. The roller bearing as claimed in claim 1, wherein said outer race is formed of two ring-shaped halves that are fixedly fastened together.

7. The roller bearing as claimed in claim 1, wherein said inner race is formed of two ring-shaped halves that are fixedly fastened together.

\* \* \* \* \*